United States Patent [19]
Pollard

[11] 4,344,639
[45] Aug. 17, 1982

[54] DUAL IMPLEMENT HITCH
[75] Inventor: Lorne R. Pollard, St. Ann's, Canada
[73] Assignee: International Harvester Co., Chicago, Ill.
[21] Appl. No.: 154,206
[22] Filed: May 29, 1980
[51] Int. Cl.³ .............................................. B60D 1/00
[52] U.S. Cl. ............................................... 280/411 C
[58] Field of Search .......... 280/411, 412, 413, 411 R, 280/411 C; 172/311, 314, 324, 679; 56/6, 7, 228, 385

[56]  References Cited
U.S. PATENT DOCUMENTS
2,971,774  2/1961  Bartel ................................. 280/412
3,738,682  6/1973  Ritter .................................. 280/413
4,178,010  12/1979  Gerber ............................... 280/412

Primary Examiner—Joseph Paul Brust
Attorney, Agent, or Firm—J. J. Getchius; F. D. Au Buchon

[57] ABSTRACT

A dual implement hitch for connection between a tractor and the implements for moving the implements to preferably an echelon position for field operation and to a tandem position for transport, while maintaining the tractor hitch pin on the line of pull of the implements. The hitch includes a hitch tongue pivotally connected to the tractor and to a support attached to the first implement. A curved beam is pivotally connected to the support forward of the tongue connection thereto and extends rearwardly over the first implement in the transport position to a caster wheel support and a pivotal connection to the second implement. Link means are pivotally connected to the hitch tongue and curved beam rearward of the pivotal connection of the curved beam to the support. A single hydraulic cylinder connected to the support and tongue provides the power for the movement of both implements to the noted positions from the tractor seat.

6 Claims, 5 Drawing Figures

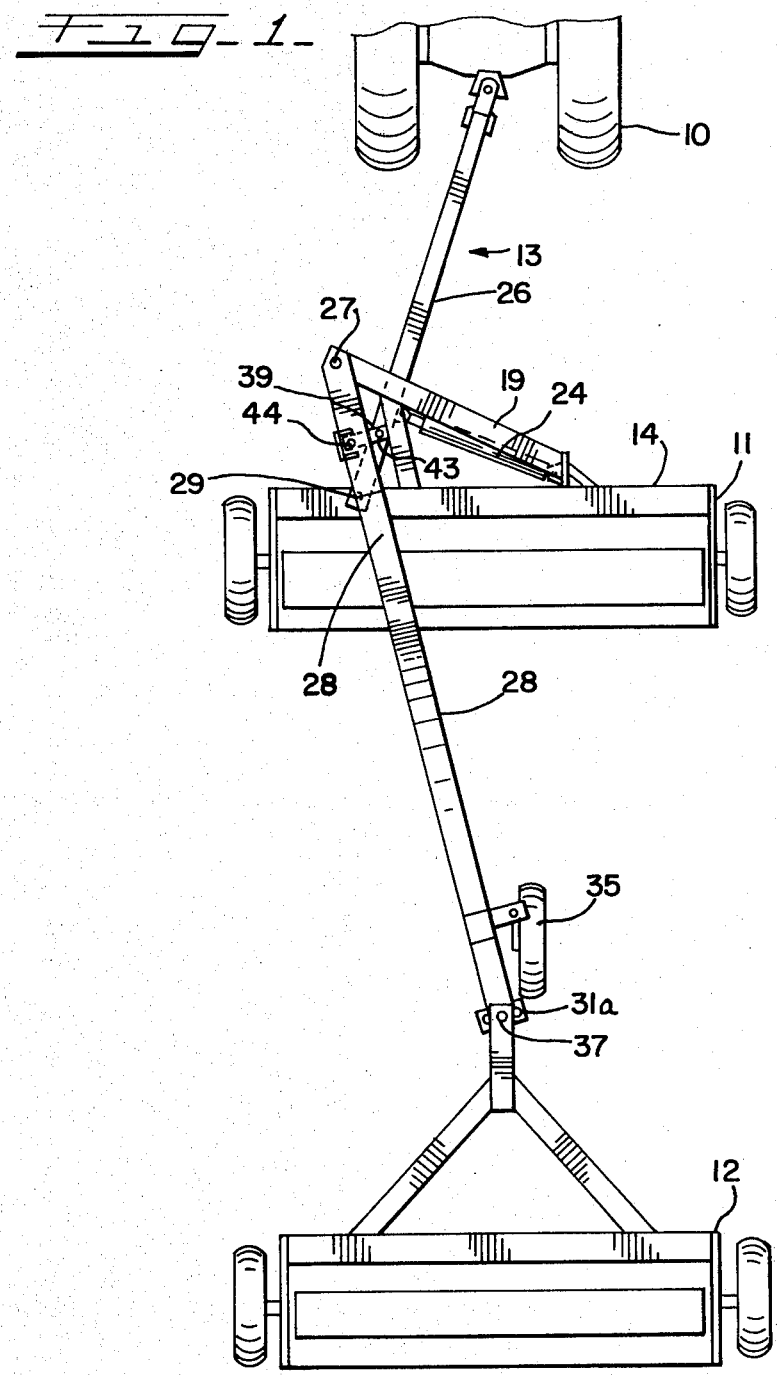

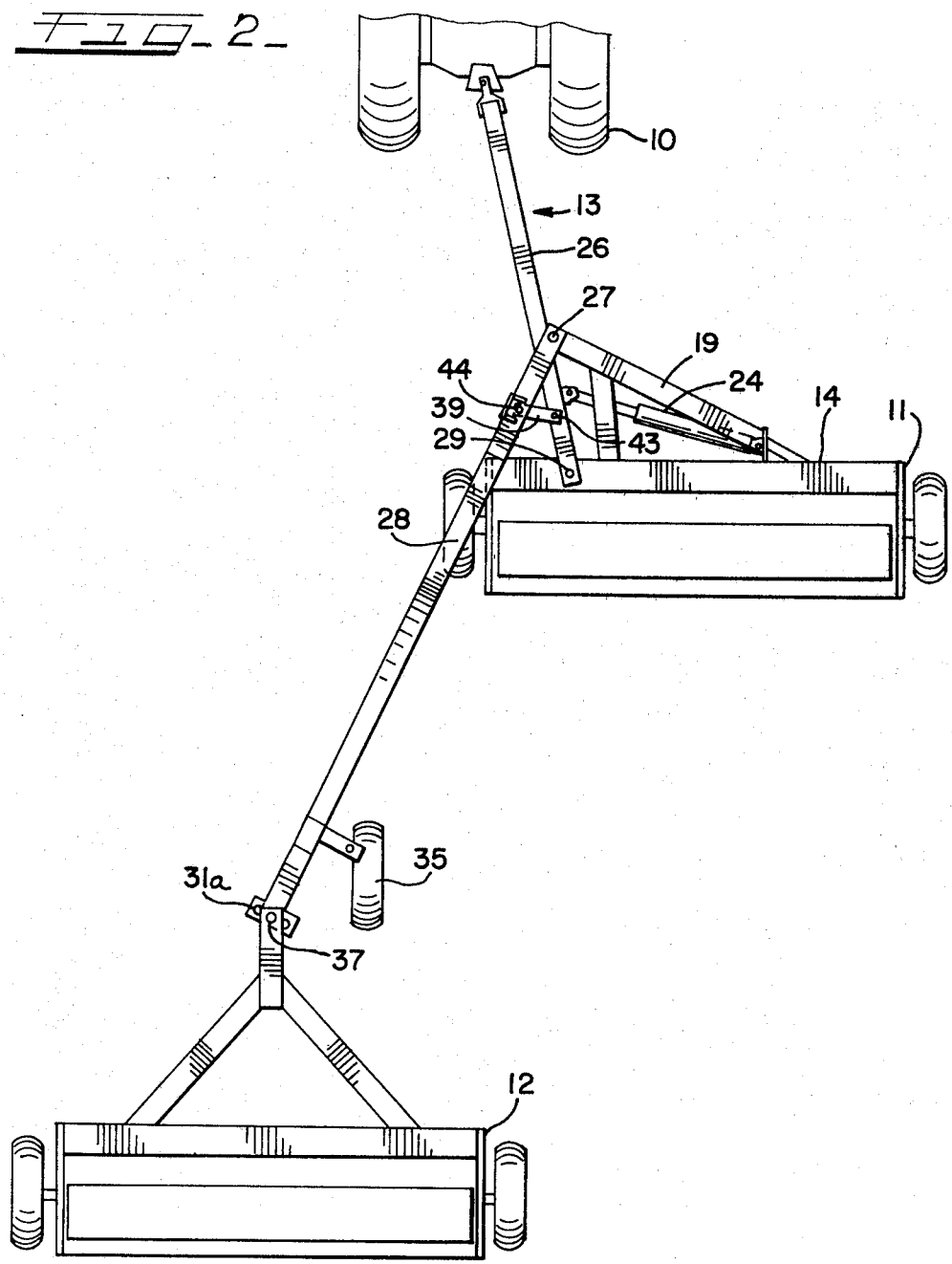

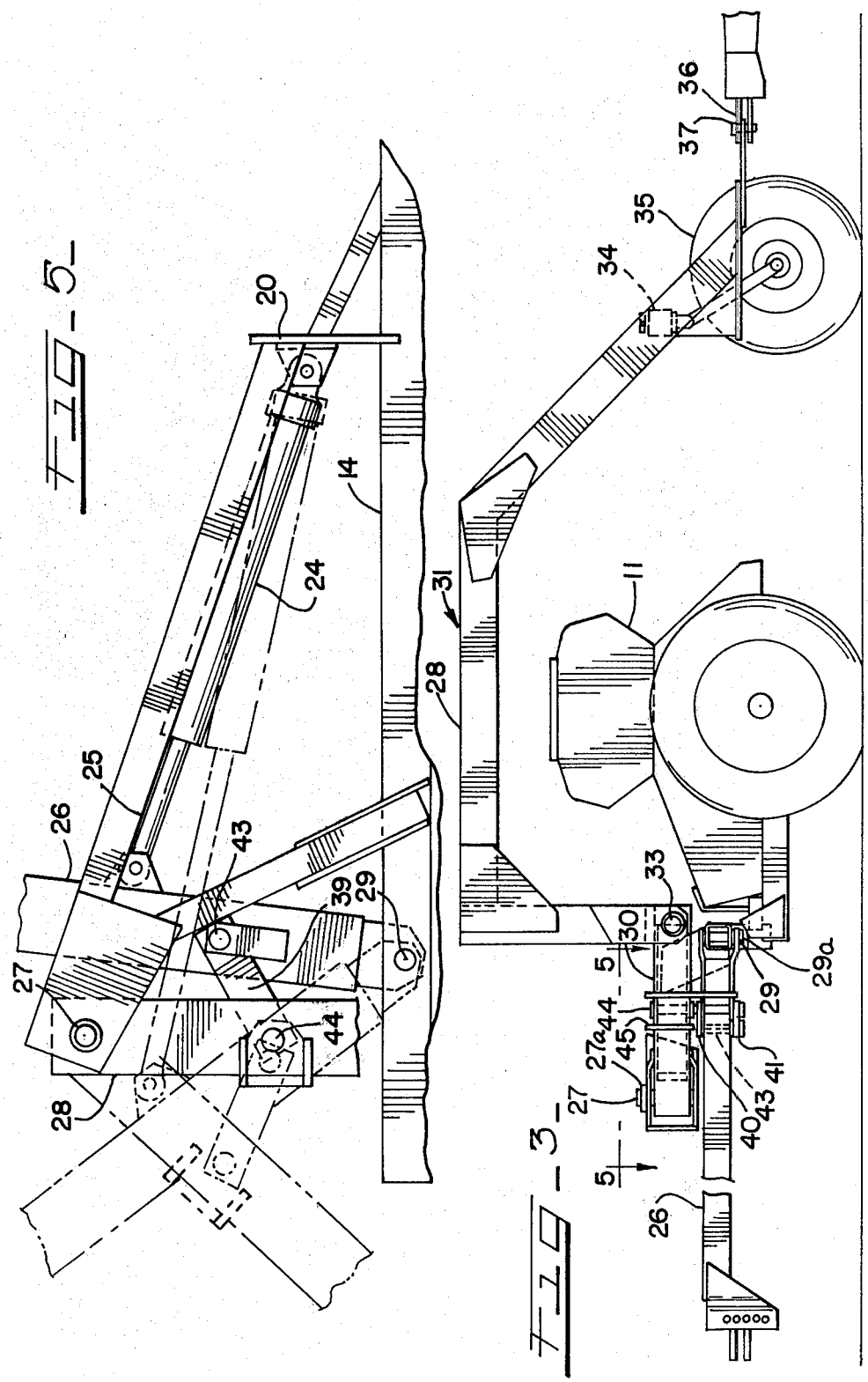

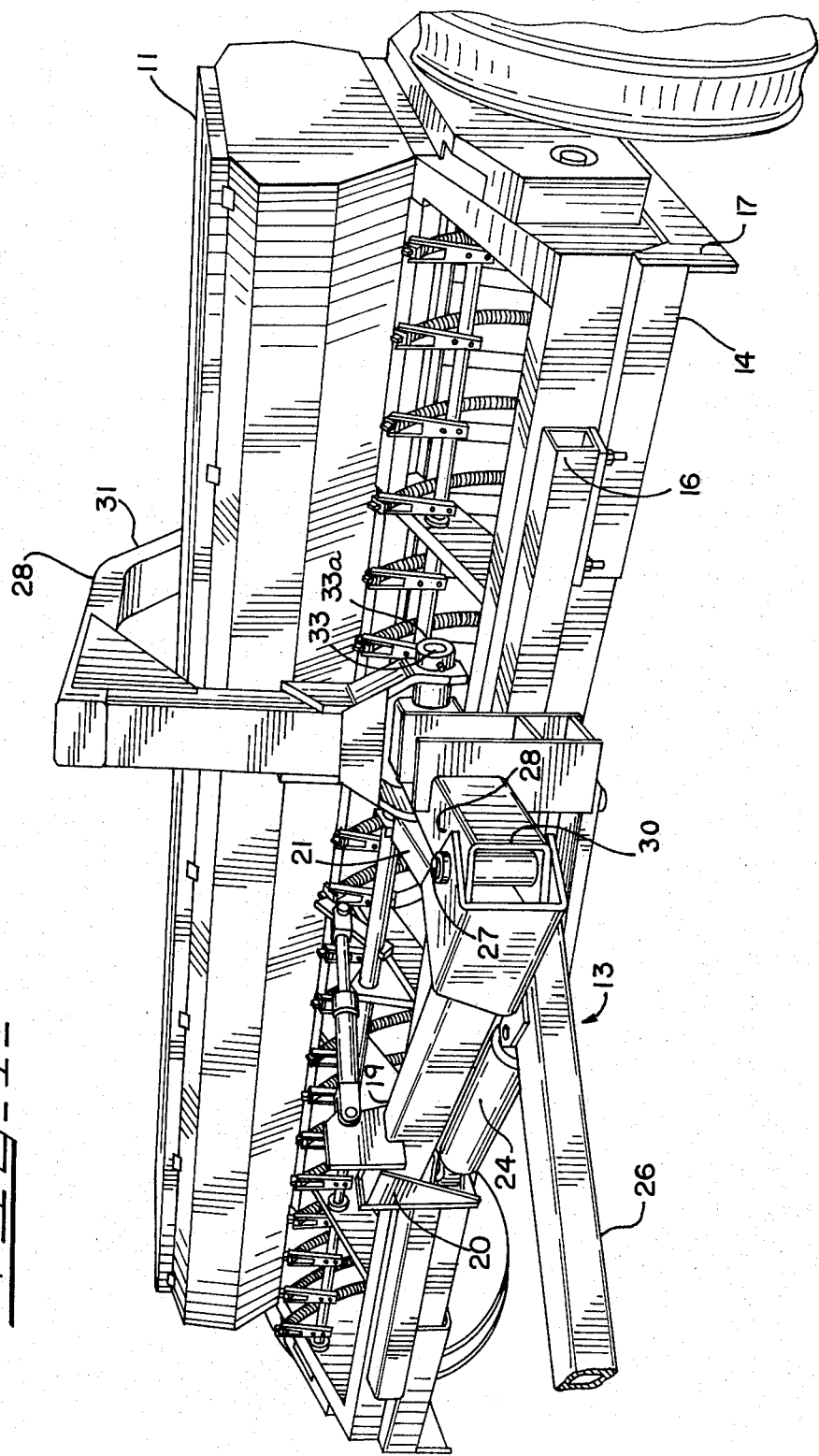

DUAL IMPLEMENT HITCH

BACKGROUND OF THE INVENTION

1. Field of the Invention

This invention pertains generally to multiple agricultural implement hitches.

2. Description of the Prior Art

In many agricultural operations, it is desirable to tow a plurality of generally laterally arranged implements via a tractor across a field so that a large expanse of field can be cultivated, planted, or otherwise conditioned in a single pass. However, the implements must also be movable to a tandem position for transport through fence gates and over narrow roads.

To achieve the transport position in the past, the operator had to dismount from the tractor, move links, and place pins in varoius holes and maneuver the tractor to different positions or unhitch the implements, completely, re-orient them, and again hitch the implements. Both approaches required a substantial amount of nonproductive time.

Where hydraulic cylinders were utilized, generally a hydraulic cylinder per implement was required usually necessitating strict adherence to a specific sequence of operations.

SUMMARY OF THE INVENTION

Applicant, in view of the disadvantages detailed above, designed a dual implement hitch wherein the implements can be shifted from an operating or working, preferably echelon position, to a tandem position for transport and vice versa from the tractor seat while the tractor is in motion. Further, the tractor hitch-pin is maintained on the line of pull of the implements in the work and transport positions to avoid side draft loads and to provide stability in transport.

Specifically, Applicant provides a support structure for the first implement (which may be a grain drill) rearward of the tractor that pivotally supports a hitch tongue or beam. The hitch tongue, at its other end, is also adapted to be pivotally connected to a tractor drawbar. Forward of the hitch tongue connection, the support structure provides a pivotal connection to a curved beam that is constructed to also extend over the first implement in the transport position and rearwardly where same is supported by a caster wheel. The curved beam at the caster wheel end is pivotally connected to the rigid hitch frame of the second implement. Mounted on the support structure of the first implement and connected preferably to the hitch tongue is the single, double acting hydraulic cylinder of the dual implement hitch. Via preferably a link arrangement pivotally connected to the hitch tongue and the curved beam, rearward of the curved beam connection to the support, extension of the cylinder will tend to move the hitch tongue, but since same is restrained by its connection to the tractor, moves the first implement to the right or working position from the tandem or transport position and moves the second implement to the left to the echelon working position. Inasmuch as the pivotal connection of the curved beam to the support structure moves farther than the travel of the tongue about the tractor pivot, the curved beam is forced to the left. In this position, the hitch tractor pivot is on the line of pull which is aligned with the center of the dual implements. Contraction of the cylinder, because of the tractor resisting to the tongue movement, moves the first implement to the left and due to the movement of the pivotal connection of the curved beam to the support structure beyond the tongue movement, to fold the curved beam to the right and hence move the second implement to the tandem transport position. In this position, the hitch pivot is on the line of pull which is central of the longitudinally aligned implements.

Noted in the design is also the compact resulting arrangement wherein a hitch (caster) support wheel or a wheeled cart is not needed between the first implement and the tractor. Hence, particularly in transport, the implement train is of reduced length for better maneuverability and stability. An additional generally transversely located horizontal pin for the curved beam allows the implements to follow the ground contour in working or transport positions.

It is therefore an object of this invention to provide a new and improved dual implement hitch.

Another object of this invention is to provide a hitch wherein the implements can be moved between working and transport positions from the tractor seat while maintaining the tractor hitch pin or the line of pull of the implements.

BRIEF DESCRIPTION OF THE DRAWINGS

FIG. 1 is a schematic plan view of the implements and the dual implement hitch of this invention with the implements shown in the transport position;

FIG. 2 is a schematic plan view, similar to FIG. 1, with the implements shown in the working position;

FIG. 3 is a side elevation view of the elements of FIG. 1;

FIG. 4 is a perspective view of the front end of the first implement of FIG. 1;

FIG. 5 is a plan view of the structure of FIG. 3 taken along line 5—5 with the moved or working position shown in broken lines.

BRIEF DESCRIPTION OF THE PREFERRED EMBODIMENT

Referring to FIGS. 1 and 2, 10 indicates a tractor for towing a front or first implement 11 which may be a grain drill shown and a rear or second implement 12 which may also be a grain drill by a dual implement hitch 13. Hitch 13 includes support structure 14 rigidly attached to front drill 11 in lieu of the conventional hitch structure mounted on rear drill 12. Structure 14 (see FIG. 4) includes square tube 16, rigidly mounted on reinforcements 17 extending forwardly of the implement 11. Tube 16 also supports upper square tube 19 which extends forwardly of implement 11 by rear reinforcement 20 and inwardly located beam 21 which also connects to lower tube 16 by a reinforcement (not shown). Double acting hydraulic cylinder 24 is pivotally mounted at its non-rod end to the lower portion of reinforcement 20. The rod end 25 of cylinder 24 is pivotally connected to the later to be described hitch tongue 26. Square tube 19 at its forward end is pivotally connected via a suitable pin 27 to a later to be described curved beam 28. Also pivotally supported by pin 29 from tube 16 is hitch tongue 26. (see FIG. 3)

Curved beam 28 is shown best in FIG. 4 and FIG. 3. Beam 28 consists of forward portion 30 and rearward and overhead curved portion 31. Portion 30 is connected via pin 27 and suitable fasteners including collar 27a to tube 19 of the support structure for movement about the vertical axis of pin 27. Portion 30 extends rearward and via horizontal pin 33 and suitable fasteners including collars 33a is connected to the portion 31. Portion 31 extends vertically upward and then rearward before curving downwardly after passing over the first implement in the transport position. Toward the rear end of 31, a generally vertical tube 34 provides a pivotal support for the standard of caster wheel 35. Caster wheel 35 supports the rear structure of hitch 13. Portion 31 also has an end with a series of holes 31a for attachment to a clevis 36 and pin 37 of the conventional hitch structure of rear implement 12. The holes 31a allow adjustment of the drill 12 relative to drill 11. Horizontal pin 33 permits the hitch structure to pivot thereabout as the implements are drawn over undulating surfaces in the work or transport positions.

Hitch tongue 26 is shown best in FIG. 3. Tongue 26 at its forward end has an adjustable clevis for connection to the drawbar of tractor 10 by a suitable clevis pin. At the rearward end of tongue 26, vertical pin 29 via suitable fasteners including collar 29a pivotally connects the tongue to beam 16 of the hitch support structure 14. As shown in FIG. 4, rod end 25 of cylinder 24 is pivotally connected to tongue 26 by a suitable clevis mounting.

To achieve movement of curved beam 28 upon movement of tongue 26 by cylinder 24, a link structure 39 is provided which is shown best in FIGS. 3, 4, and 5. Link structure 39 includes upper link 40 and lower link 41 which are pivotally connected to tongue 26 by vertical pin 43 extending therethrough and fasteners. Links 40 and 41 are also pivotally connected by vertical pin 44 and fasteners to ladder like structure 45 (partially cut away in FIG. 3) rigidly mounted on the forward portion 30 of curved beam 28. Structure 45 extends above the links, due to its connection to curved beam 28, and pin 44 therefore extends through portion 30 and the lower ladder like structure 45 to provide pivotal support for the vertically spaced links. FIG. 5 shows the tongue 26, curved beam 28 and link structure 39 in solid lines for the transport position corresponding to FIG. 3. The broken line position shows the elements in the working or operating position.

In operation, with the implements arranged as in FIG. 1, with cylinder 24 retracted, the tractor pulls the implement in the transport position with the line of pull shown in a broken line central of the tandem arranged implements and the maximum width of the train that of a single implement. When it is desired to place the implements in the work or operating position the rod of cylinder 24 is extended, while on the go, and the rod attempts to move the tongue, but since restrained by the tractor the first implement moves to the right along with its support structure. The support structure and the pivot 27 move through a greater arc than the tongue and therefore causes the curved beam to pivot to the left to the work position of FIG. 2 with the center of the echelon formation of implements remaining on the line of pull as shown in a broken line. Contraction of the rod of cylinder produces a contrary action returning the implements to the transport position. Only one cylinder is required to achieve the various positions due to its specific location in relation to the movable elements of the hitch structure unlike the multi-cylinder devices of the past.

I claim:

1. In combination, an implement and a hitch adapted to be drawn by a tractor, comprising:

an implement, a support mounted on the front of said implement, a hitch, said hitch including a curved beam pivotally mounted on said support and constructed to extend over and rearwardly of said implement, said curved beam being adapted to be pivotally connected adjacent its rearward end to another implement, a caster wheel mounted on said curved beam forward of the connection for the another implement, a hitch tongue adapted to be pivotally connected to a tractor drawbar, said tongue also being pivotally connected to said support, means connecting said tongue and curved beam for relative motion therebetween, said means being located rearwardly of the pivotal mounting of said curved beam on said support, and hydraulic power means mounted on said support for moving said hitch tongue and said curved beam via said means from a tandem transport implement position wherein the line of pull to the tractor is substantially aligned with the center of said implement and the another implement and an echelon operating position wherein the line of pull of the tractor is substantially aligned with the adjacent ends of said implement and the another implement.

2. The combination of claim 1 wherein said hydraulic power means is connected to said tongue.

3. The combination of claim 2 in which said means is a link means pivotally connected to said tongue and said curved beam.

4. The combination of claim 3 in which said hydraulic power means is a double acting cylinder and is connected to said tongue forward of the connection of said tongue to said support.

5. The combination of claim 4 in which said curved beam has a horizontal pivot adjacent its connection to said support for movement in a vertical plane due to varying ground elevations in transport and in echelon operating positions.

6. The combination of claim 5 further comprising means on said curved beam for varying the positions between said implement and the another implement.

* * * * *